(12) United States Patent
Lyssenko et al.

(10) Patent No.: US 12,438,708 B2
(45) Date of Patent: Oct. 7, 2025

(54) SYSTEM AND METHOD FOR ELIMINATING POTENTIAL SECURITY BREACH WHEN TRANSITIONING TO QUANTUM-SECURE ENVIRONMENT

(71) Applicant: Arista Networks, Inc., Santa Clara, CA (US)

(72) Inventors: Dmitry Lyssenko, Brussels (BE); Olufemi Komolafe, Edinburgh (GB)

(73) Assignee: ARISTA NETWORKS, INC., Santa Clara, CA (US)

( * ) Notice: Subject to any disclaimer, the term of this patent is extended or adjusted under 35 U.S.C. 154(b) by 118 days.

(21) Appl. No.: 18/545,957

(22) Filed: Dec. 19, 2023

(65) Prior Publication Data

US 2025/0202687 A1 Jun. 19, 2025

(51) Int. Cl.
*H04L 9/08* (2006.01)

(52) U.S. Cl.
CPC ............... *H04L 9/0852* (2013.01)

(58) Field of Classification Search
None
See application file for complete search history.

(56) References Cited

U.S. PATENT DOCUMENTS

2018/0013556 A1\* 1/2018 Saavedra ............... H04L 67/12

\* cited by examiner

*Primary Examiner* — Cai Y Chen
(74) *Attorney, Agent, or Firm* — Sprinkle IP Law Group

(57) ABSTRACT

A physical link is split between network devices into a first logical link and a second logical link. The first logical link is designated for communicating user data. The second logical link is designated for exchanging key identifiers (key IDs) only. The second logical link is left open and unencrypted and the key IDs are exchanged over the second logical link. Using the key IDs, quantum keys are acquired, by an agent on each respective network device, from a quantum key distribution network or subsystem. The quantum keys thus acquired are then applied to the physical link between the network devices to thereby transition the physical link between the network devices to a quantum-secure environment and open the first logical link for communicating the user data in the quantum-secure environment.

20 Claims, 1 Drawing Sheet

SYSTEM AND METHOD FOR ELIMINATING POTENTIAL SECURITY BREACH WHEN TRANSITIONING TO QUANTUM-SECURE ENVIRONMENT

TECHNICAL FIELD

This disclosure relates generally to network security. More particularly, this disclosure relates to a system and method for eliminating potential security breach when transitioning to a quantum-secure environment.

BACKGROUND OF THE RELATED ART

Network security solutions that leverage advances in quantum cryptography can be more secure and future-proof than today's approaches to network security. Quantum Key Distribution (QKD) refers to an application of quantum cryptography that can facilitate the distribution of symmetric secret quantum keys (QKs) that network devices can use to encrypt and decrypt messages exchanged over an insecure public network.

However, there is a potential weakness in leveraging QKD for the distribution of the QKs between the network devices. This is because the data link between the network devices cannot be quantum-secured immediately. From when the data link is up to when the first set of QKs are retrieved from a QKD network and applied to the data link, there is a window of time that the data link is not quantum-secure. During this window of time, there is a real possibility that sensitive user data exchanged over the data link could be intercepted, for instance, by a bad actor who compromised the secret keys and tapped into the data link.

In view of the foregoing, there is a need for innovations and improvements in network security. This disclosure addresses this need and more.

BRIEF DESCRIPTION OF DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Specific embodiments will now be described with reference to the accompanying figures (FIGS.). The figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

This disclosure provides a new approach to eliminate a potential security breach when quantum cryptography is leveraged to facilitate the distribution of symmetric secret keys between network devices over an insecure public network.

This new approach ensures that no data (e.g., sensitive user information) is exchanged using a Layer 2 security protocol called Media Access Control Security (MACSec) over a data link (e.g., a MACSec link) before QKs are acquired and used for encryption/decryption at both ends of the data link. Furthermore, in this approach, the applied QKs are not intercepted in any manner. Essentially, the approach guarantees that the data link between network devices is blocked from exchanging data and becomes usable for exchanging data only after QKs have been successfully used to encrypt the traffic at both ends.

Before describing embodiments of the disclosure in detail, how QKD technology works in assisting installation of MACSec is described below with reference to FIG. 1. Those skilled in the art appreciate that MACSec, also known as IEEE 802.1AE, is a network security standard that operates at the medium access control layer and defines connectionless data confidentiality and integrity for media access independent protocols.

As those skilled in the art can also appreciate, Secure Application Entities (SAEs) are applications running on network devices that retrieve the QKs from key management entities (KMEs). The KMEs, which provide the QKs, are nodes in a QKD network. Such an application can use the retrieved QKs to encrypt/decrypt traffic exchanged over the MACSec tunnel and, in doing so, eliminate Man-in-the-Middle (MITM) attacks.

However, QKD technology still allows a potential opportunity window for a security breach from the instance the MACSec link comes until the first quantum keys are installed if the initial user-configured keys were compromised. The initial user-configured keys are used to provide a basic level of security for encrypting MACSec traffic for transmitting the MACSec traffic over the MACSec tunnel, prior to the application of QKs according to some embodiments disclosed herein.

Figure 1:
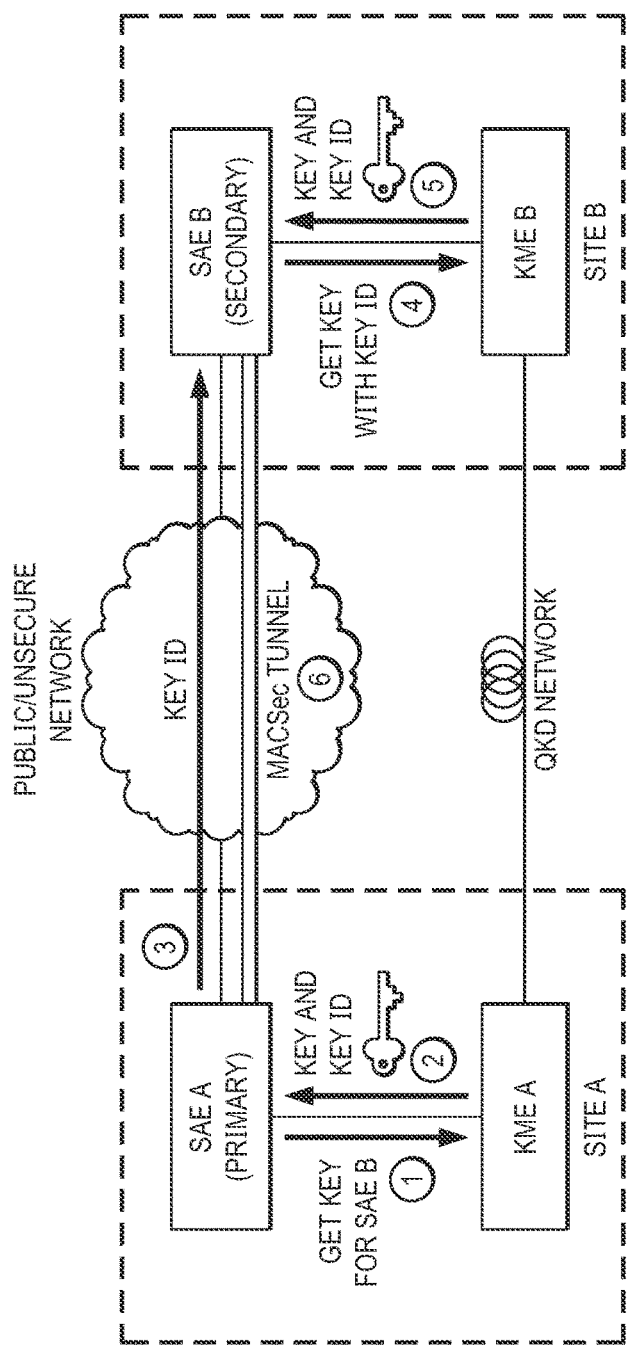
FIG. 1 depicts an example of a networked computing environment in which quantum keys and key identifiers are exchanged between network appliances.

FIG. 1 generally depicts a networked computing environment in which quantum keys and key identifiers are exchanged between network appliances operating at different physical locations, which are respectively referred to in FIG. 1 as Site A and Site B. In the example of FIG. 1, a secure application entity A (SAE A) running on a network appliance (Primary) requests a quantum key (QK) from a key management entity A (KME A) at a first location (Site A) (Step 1 shown in FIG. 1) and receives a QK and a corresponding key identifier (ID) from KME A (Step 2 shown in FIG. 1). An SAE is an entity that requests one or more keys from a KME for one or more applications running in cooperation with one or more other SAEs. A KME (e.g., KME A or KME B shown in FIG. 1) is a device responsible for QK generation and distribution. SAE and KMEs are known to those skilled in the art and thus are not further described herein. The SAE A sends the key ID retrieved from KME A over a public, unsecure network to SAE B running on another network appliance (Secondary) at a second location (Site B) (Step 3 shown in FIG. 1). SAE B uses the key ID received from SAE A to request a QK from KME B at the second location (Site B) (Step 4 shown in FIG. 1) and receives a QK from KME B (Step 5 shown in FIG.

1). SAE B uses the retrieved QK to encrypt/decrypt traffic exchanged with SAE A using the MACSec protocol (Step 6 shown in FIG. 1).

As shown in FIG. 1, MACSec traffic will be transmitted over a public, unsecure network through a secure MACSec tunnel referred to herein as a "data link," while key IDs are exchanged over a "control link." A goal of a new approach disclosed herein is to ensure that no data, including sensitive user information, can be exchanged over the data link prior to the data link being secured using QKs. In one embodiment, non-matching secret keys are applied to the data link to block the data link and prevent the transfer of data over the data link. This intentional "misconfiguration" effectively prevents the exchange of user data over the data link until the data link could be secured using the QKs acquired from the KMEs. In this way, the exchange of user data over the data link will be blocked until QKs (which, by QKD design, are matching keys) could be applied to encrypt/decrypt traffic flowing over the data link (i.e., QKs will unblock the data link and allow the data link to enter a quantum-secure state).

In one embodiment, the SAEs can exchange key IDs over the control link. In one embodiment, the control link is left open and unencrypted. The key IDs, should they be compromised via the control link, are insufficient to decrypt traffic communicated over the data link. In one embodiment, the key IDs thus exchanged can be used by the respective SAEs to acquire QKs from the respective QKD subsystems. The SAEs can then use the QKs to encrypt/decrypt information exchanged over the data link, thereby establishing the data link as being quantum-secure.

In the example of FIG. 1, user-configured keys are supposed to be used to encrypt MACSec traffic transmitted over the MACSec link. However, because these user-configured keys do not match, MACSec traffic is blocked from being transmitted over the MACSec link. As discussed above, this intentional "misconfiguration" of non-matching keys effectively blocks any exchange of data, including sensitive user information, over the MACSec link until the MACSec link could be secured using QKs acquired from the respective QKD subsystems (e.g., KME A and KME B shown in FIG. 1). The use of QKs to encrypt/decrypt MACSec traffic transitions the MACSec-secure link into a quantum-secure link between the SAE instances (SAE A and SAE B) running on the respective network appliances.

In some embodiments, a certain data exchange must occur between the SAEs before the QKs could be retrieved and applied. That data being exchanged (namely, key IDs) is safe to share over an unprotected/unsecured/unencrypted link (e.g., a control link that is left open and unencrypted). This is because the mapping between a QK and a "key ID" is kept internal to KMEs only. Also, a QK is not computationally derivable from a key ID. Thus, even if key IDs are intercepted by a bad actor, they do not provide any useful and/or relevant information.

That is, while the link between SAE A and SAE B can be secured with MACSec, it cannot be quantum-secured immediately with the QK because in order to retrieve the QK, some communication over that link must happen. For instance, referring to FIG. 1, the key ID received by SAE A (as a result of key acquisition from KME A) must be sent to SAE B (e.g., Step 3 shown in FIG. 1) so that SAE B could retrieve its own copy of the QK.

If the link between SAE A and SAE B is unsecured, unencrypted, or otherwise unprotected, (before, during, and after the key ID exchange), then until the moment when the QKs are applied, it would be easy to intercept sensitive user-data information that, meanwhile could be flowing through that link. Even if the link is protected using the traditional/legacy MACSec technology, it would be harder, but not impossible, to intercept sensitive user-data traffic. Thus, if the link between the SAEs is unprotected, or even protected via standard MACSec technology, there is still a chance that the user data could be compromised immediately, before the QKs could be applied, as if the intruder is tapped into that link—it will see all the traffic unencrypted. Understandably, such a scenario is not desirable.

As a non-limiting example, an initial link starting scenario would be that a user configures matching MACSec Static Secure Association Keys (SAKs) on both ends of a MACSec link (i.e., starting in a MACSec-secure environment). If the user keys are kept secret and non-compromised, such an environment (and thus the link) is considered safe and secure.

However, if the user-configured keys become compromised, then an eavesdropper tapped into the MACSec link could gain access to the user-sensitive data that might be already flowing through the MACSec link before the MACSec link transitions to a quantum-secure state.

Another scenario would be that a MACSec link transitioning to a quantum-secure state may take an unpredictably long time. This delay may be caused by KME A and/or KME B being temporarily down, or slow (e.g., one is or both are experiencing a heavy consumption of the processing power or other impeding conditions). Such a delay can increase the risk of the MACSec link being compromised before the QKs could be applied.

What is needed, therefore, is a technique that can eliminate the above-described potential threat and that would make the exchange between SAEs entirely quantum-secure. In some embodiments, this technique involves the following steps:
1) initially ensure that the initial (user-configured) keys are non-matching on both ends of a MACSec tunnel connecting two SAEs so as to prevent any user-sensitive data communication across the MACSec channel; and
2) allow the MACSec/QKD configuration software applications, i.e. "agents," on the respective network appliances (on both ends of the MACSec tunnel) to communicate and facilitate QK distribution so as to ensure that:
   a. MACSec is running over the IEEE 802.1Q trunk (i.e., isolated into a dedicated VLAN); and
   b. communications between the agents are separated into another isolated VLAN (other than the one used for MACSec).

As those skilled in the art can appreciate, IEEE 802.1Q, often referred to as Dot1q, is a networking standard that supports virtual local area networking (VLANs) on an IEEE 802.3 Ethernet network. Dot1q, VLAN, and IEEE 802.3 Ethernet network are known to those skilled in the art and thus are not further described herein.

Figure 2:
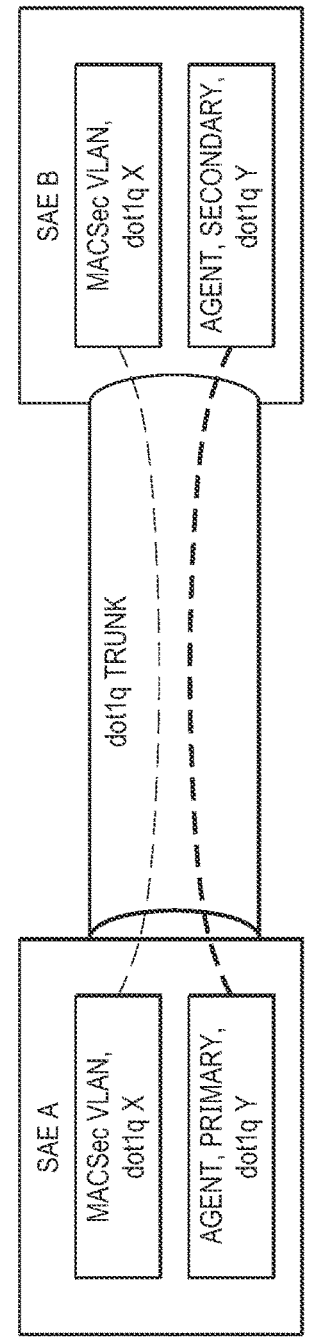
FIG. 2 shows secure application entities exchanging keys and key identifiers separately via respective logical links to eliminate a potential security breach and prevent user data exchange over an unsecured network, according to some embodiments disclosed herein.

FIG. 2 illustrates, by example, how the above-described technique can make a MACSec link entirely safe for the sensitive user data, even if the initial user-configured keys are compromised. A goal here is to ensure that, before QKs could be applied, no user-data flows through a physical link connecting two SAEs (e.g., between SAE A and SAE B shown in FIG. 1), while allowing the exchange of key IDs between the SAEs such that the QKs could be applied on both ends of the physical link, effectively opening the data link for user-sensitive traffic while the link is quantum-safe.

As illustrated in FIG. 2, traffic flows between two endpoints (SAE A and SAE B) of a link configured as a Dot1q trunk. The MACSec traffic is isolated into a first logical link (Dot1q X) and the traffic with key IDs is in a second, non-encrypted logical link (Dot1q Y). The first logical link is designated for user-traffic and the second local link is designated for the key IDs exchange only.

In some embodiments, even before opening the physical link (i.e., bringing up the ports on both ends), the MACSec tunnel (in a static SAK mode) on the Dot1q trunk is configured with non-matching user-configured keys. This effectively will prevent any (including user) data traffic flow through the MACSec tunnel. The Dot1q Y link is left completely open and unencrypted as that link does not require any protection/encryption.

The above-described schema would allow both SAE A and SAE B to:

1) exchange the required information (key IDs) over the second logical link (Dot1q Y), while the first logical link (Dot1q X) remains logically blocked until QKs are applied,
2) acquire the QKs from QKD subsystems, respectively (e.g., KME A and KME B shown in FIG. 1) and
3) apply the QKs, effectively opening the first logical link (Dot1q X) for data flow and, at the same time, ensuring that the applied QKs are not intercepted in any manner (and hence the MACSec link is quantum-safe).

At this point, the agents may freely exchange the information over the Dot1q Y (i.e., the second logical link). The communications between the agents over the second logical link do not include any sensitive information. Once the agents acquire the QKs and install them on the respective SAEs, the Dot1q X link (i.e., the first logical link) becomes quantum-secure and traffic can start passing through the first logical link.

In this disclosure, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method, comprising:
configuring a link for communicating user data between network devices with static keys that do not match, wherein any transmission of the user data over the link is initially blocked because the static keys do not match and continues to be blocked until quantum keys can be applied to encrypt network traffic communicated over the link;
exchanging key identifiers of the quantum keys over the link;
acquiring the quantum keys from a quantum key distribution subsystem using the key identifiers; and
applying the quantum keys to encrypt the network traffic communicated over the link between the network devices to thereby unblock the transmission of the user data and transition the link between the network devices to a quantum-secure link.

2. The method according to claim 1, further comprising:
splitting the link between the network devices into a first logical link and a second logical link;
designating the first logical link for communicating the user data between the network devices; and
designating the second logical link for exchanging the key identifiers of the quantum keys, wherein the second logical link is left open and unencrypted.

3. The method according to claim 2, wherein the first logical link comprises a data link and wherein the second logical link comprises a control link.

4. The method according to claim 2, wherein the first logical link comprises a first virtualized connection and wherein the second logical link comprises a second virtualized connection.

5. The method according to claim 1, wherein each of the network devices comprises a secure application entity (SAE), wherein the SAE runs a MACSec/QKD configuration software application that allows deployment of MACSec links with the quantum key distribution subsystem, and wherein the SAE comprises an application configured for exchanging the key identifiers, acquiring the quantum keys from the quantum key distribution subsystem using the key identifiers, and applying the quantum keys to the link between the SAEs.

6. The method according to claim 1, wherein the quantum key distribution subsystem comprises a key management entity (KME) configured for quantum key generation and distribution.

7. The method according to claim 1, wherein the link comprises a Media Access Control security (MACSec) link.

8. A system, comprising:
a processor;
a non-transitory computer-readable medium; and
instructions stored on the non-transitory computer-readable medium and translatable by the processor for:
configuring a link for communicating user data between network devices with static keys that do not match, wherein any transmission of the user data over the link is initially blocked because the static keys do not match and continues to be blocked until quantum keys can be applied to encrypt network traffic communicated over the link;
exchanging key identifiers of the quantum keys over the link;
acquiring the quantum keys from a quantum key distribution subsystem using the key identifiers; and
applying the quantum keys to encrypt the network traffic communicated over the link between the network devices to thereby unblock the transmission of the user data and transition the link between the network devices to a quantum-secure link.

9. The system of claim 8, wherein the instructions are further translatable by the processor for:
splitting the link between the network devices into a first logical link and a second logical link;
designating the first logical link for communicating the user data between the network devices; and
designating the second logical link for exchanging the key identifiers of the quantum keys, wherein the second logical link is left open and unencrypted.

10. The system of claim 9, wherein the first logical link comprises a data link and wherein the second logical link comprises a control link.

11. The system of claim 9, wherein the first logical link comprises a first virtualized connection and wherein the second logical link comprises a second virtualized connection.

12. The system of claim 8, wherein each of the network devices comprises a secure application entity (SAE), wherein the SAE runs a MACSec/QKD configuration software application that allows deployment of MACSec links with the quantum key distribution subsystem, and wherein the SAE comprises an application configured for exchanging the key identifiers, acquiring the quantum keys from the quantum key distribution subsystem using the key identifiers, and applying the quantum keys to the link between the SAEs.

13. The system of claim 8, wherein the quantum key distribution subsystem comprises a key management entity (KME) configured for quantum key generation and distribution.

14. The system of claim 8, wherein the link comprises a Media Access Control security (MACSec) link.

15. A computer program product comprising a non-transitory computer-readable medium storing instructions translatable by a processor for:
configuring a link for communicating user data between network devices with static keys that do not match, wherein any transmission of the user data over the link is initially blocked because the static keys do not match and continues to be blocked until quantum keys can be applied to encrypt network traffic communicated over the link;
exchanging key identifiers of the quantum keys over the link;
acquiring the quantum keys from a quantum key distribution subsystem using the key identifiers; and
applying the quantum keys to encrypt the network traffic communicated over the link between the network devices to thereby unblock the transmission of the user data and transition the link between the network devices to a quantum-secure link.

16. The computer program product of claim 15, wherein the instructions are further translatable by the processor for:
splitting the link between the network devices into a first logical link and a second logical link;
designating the first logical link for communicating the user data between the network devices; and
designating the second logical link for exchanging the key identifiers of the quantum keys, wherein the second logical link is left open and unencrypted.

17. The computer program product of claim 16, wherein the first logical link comprises a data link and wherein the second logical link comprises a control link.

18. The computer program product of claim 15, wherein the link comprises a Media Access Control security (MACSec) link.

19. The computer program product of claim 15, wherein each of the network devices comprises a secure application entity (SAE), wherein the SAE runs a MACSec/QKD configuration software application that allows deployment of MACSec links with the quantum key distribution subsystem, and wherein the SAE comprises an application configured for exchanging the key identifiers, acquiring the quantum keys from the quantum key distribution subsystem using the key identifiers, and applying the quantum keys to the link between the SAEs.

20. The computer program product of claim 15, wherein the quantum key distribution subsystem comprises a key management entity (KME) configured for quantum key generation and distribution.

* * * * *